United States Patent [19]

Shatila

[11] 3,988,484

[45] Oct. 26, 1976

[54] PROCESS FOR PRODUCING TEXTURIZED DEHYDRATED POTATO RICE AND RELATED PRODUCTS

[76] Inventor: Mounir A. Shatila, 1375 York Drive, Blackfoot, Idaho 83221

[22] Filed: Apr. 21, 1975

[21] Appl. No.: 569,903

[52] U.S. Cl. .............................. 426/99; 426/637; 426/549; 426/453; 426/285
[51] Int. Cl.² ........................................... A23L 1/10
[58] Field of Search ............... 426/96, 98, 99, 550, 426/560, 637, 640, 438–441, 385, 549, 533, 578, 302, 305, 307, 443, 444, 451, 455, 456, 464, 465, 466, 524, 808

[56] References Cited
UNITED STATES PATENTS

| | | | |
|---|---|---|---|
| 3,056,683 | 10/1962 | Cyr | 426/637 |
| 3,518,097 | 6/1970 | Menzi | 426/385 |
| 3,634,105 | 1/1972 | Beck | 426/549 |

*Primary Examiner*—Norman Yudkoff
*Assistant Examiner*—Martin G. Mullen
*Attorney, Agent, or Firm*—Robert M. Stephenson

[57] ABSTRACT

A dough of about 26% solids and about 74% moisture by weight comprising cooked intact separated potato cells, a synergistic binder-film forming matrix system, and water is formed into rice-like pellets or strips which are predried to about 30% moisture in hot air after which the predried pieces are coated with oil and heated at about 300° F. to texturize the surface. The pieces are then dried to about a final 7–8% moisture by weight to produce a dehydrated instantized texturized piece which can be reconstituted by standing in boiling water for about 3–4 minutes to produce a finished dish with unique rice-like texture. Other dishes such as Hashbrowns, potato pancakes and one-pan stove top recipes such as Spanish rice, rice pudding and the like can be made from the dry or reconstituted product.

16 Claims, No Drawings

PROCESS FOR PRODUCING TEXTURIZED DEHYDRATED POTATO RICE AND RELATED PRODUCTS

BACKGROUND OF THE INVENTION

Field of the Invention

The invention relates to the production of a potato dough which is then formed into pieces which are first partly dried in hot air and then oil coated and dried to completion in hot air or oil. The dried product is reconstitutable in hot water without cooking to form rice-like textured rice and potato dishes.

Description of the Prior Art

The prior art discloses many processes and products which utilize a potato dough which is formed, treated and dried or fried to produce finished products as Hashbrowns, french fries, potato chips, snacks, mashed potatoes and the like.

Much of the prior art discloses potato dough suitable for expanded snacks and chips and which either use starting materials without appreciable intact potato cells or which during the process, subject the dough to conditions which give the desired cell rupture which is required to get expansion. Examples are Gerkins U.S. Pat. No. 3,692,537, Loska U.S. Pat. No. 3,297,450, Fast U.S. Pat. No. 3,451,822, Rock U.S. Pat. No. 3,681,084, Hilton U.S. Pat. Nos. 3,109,739 and 3,230,094, Tan U.S. Pat. No. 3,259,503, Wilder U.S. Pat. No. 3,649,305, Potter U.S. Pat. No. 3,384,495 and Spiesser U.S. Pat. No. 3,863,770. Such a dough is not acceptable in applicant's process. To attain the texturized instantized piece, the dough solids must contain at least 80% intact cells and preferably 85 to 95% intact cells.

Frank U.S. Pat. No. 3,410,702 and Beck U.S. Pat. No. 3,634,105 both use largely intact cells in combination with raw starch. Frank's dough has a moisture content of about 75% by weight, the solids of which comprise 77% intact cooked potato cells and 23% raw ungelatinized starch cells. The dough is riced and dried and is used as a component to reconstitute in boiling water to form a sticky mashed potato which binds and coats natural julienne strips to form a cake or patty which Frank calls hashbrowns. Gelatinization occurs during boiling water rehydration and this component loses piece identity when reconstituted. The solids of Becks's dough are at least 80% intact potato cells and 6–20% raw starch which is completely gelatinized before drying. Beck's dough contains no other binders; contains no oil; and is dried to completion in hot air. Although the reconstituted product has piece identity, it is not instant and has the texture of a blanched strip of natural potato.

Rendle, Great Britain Pat. No. 608,996, Keller, U.S. Pat. No. 3,468,673 and Willard, U.S. Pat. No. 3,399,062 disclose potato doughs of about 67% moisture content comprising essentially cooked intact potato cells with pregelatinized cooked starch or gums. No raw starch is utilized and the doughs are formed and fried directly into french fries with no preliminary air drying or finish drying to 7% moisture in oil.

Liepa, U.S. Pat. No. 3,396,036 discloses a potato dough of about 53–73% moisture comprising intact cooked potato and milk which is formed and directly fried to produce crisp brown products. No raw starch or gums are utilized. There is no predrying-in-air processing step.

Sijbring, U.S. Pat. No. 3,687,679 discloses a dough of about 67% moisture comprising intact cooked cells and gums. The dough is formed, predried at 180° C. (356° F.) in hot fat to about 19.2% moisture and finish fried in vacuum at 90° C. (194° F.) to form golden brown french fries. No raw starch ingredient is used and no predrying step in air is utilized.

In the prior art, only Frank and Beck disclose a dough similar to applicant's dough and which is dehydrated and then reconstituted in hot water. Neither utilizes a binder other than starch, and neither discloses a final dry step in the presence of oil which texturizes the surfaces. Frank's dough ingredient reconstitutes to a sticky mash and Beck's product resembles a natural potato strip and does not have the unique rice-like texture and is not reconstitutable by standing covered with boiling water in 3–4 minutes.

SUMMARY OF THE INVENTION

It has been found that when cooked potato solids consisting essentially of intact potato cells and raw starch-containing binder are formed into a dough of about 74% moisture by weight using liquid which is hot enough to expand the potato ingredient, but below the temperature required to gelantinize the starch, the dough can be formed into discrete pieces which are dried in unpuffed form by heated flowing air to a moisture content preferably about 30%, to form non-fragile, non-sticky discrete pieces. When these pieces are then further dried in the presence of hot oil at 300° F. until the pieces are in the range of 7–8% moisture by weight, the raw starch in the surfaces of the pieces is gelatinized and the gelatinized surfaces impregnated with oil so that upon the addition of boiling liquid the product is instantized and is capable of rapid uniform reconstitution to produce potato "rice" which can be consumed as rice would be, or can be utilized in rice dishes or can be fried to produce Hashbrowns or potato pancakes or like potato dishes. The reconstituted product has pleasant, buttered rice appearance and a unique rice-like texture quite unlike conventional cooked potato products.

DESCRIPTION OF THE PREFERRED EMBODIMENT

An aqueous dough of about 74% moisture content by weight is produced with the following solids composition:

| | |
|---|---|
| Cooked intact cell potato solids | 91.5 % |
| Raw Starch | 5.0 % |
| Guar gum binder | 2.0 % |
| Flavoring (optional) | 1.5 % |
| | 100 % |

The above ingredients are mixed with water at about 140° F. to produce a formable dough with the raw starch in an ungelatinized condition.

The above uniform dough is then extruded through a die consisting of slots about 3/32 inch high and about ¾ inch long. When the extrudate protrudes about 3/32 inch from the outer face of the die, the protruding ribbons are severed to form multiple pieces about 3/32 × 3/32 × ¾ inch. The pieces are then dried in a fluidized bed while being exposes to air heated to about 180° F. to reduce the moisture content to about 30% by weight.

The predried pieces are then added to deep fat at a temperature of about 300° F. for about 30-40 seconds and removed when the moisture content is about 7–8% by weight. At this moisture content, the pieces are not fried or toasted and are still creamy yellow in color.

When the above product is covered with about 1.6 parts by weight of boiling water to each part by weight of product; covered; and allowed to stand about 3-4 minutes, the free liquid is absorbed, thereby producing an excellent product resembling freshly cooked buttered rice in taste and texture. The product can be used as a rice replacement in rice dishes or can be fried with butter to produce Hashbrowns or can be formed into cakes and fried to produce excellent potato pancakes, etc. When the reconstituted product is frozen and later thawed, as in TV dinner use, there is no weeping, and the texture is judged superior to that of normal rice.

In variations of this preferred embodiment, it has been found that acceptable products result by varying the raw starch ingredient in the range of 3 to 10%. Furthermore, soy protein or soy flour can be substituted for the raw starch ingredient retaining all the required characteristics except freeze-thaw stability.

It was also determined that satisfactory products could be produced when the binder concentration varied in the range of 1 to 5%.

The optional flavoring ingredient of the formulation comprises largely salt with minor amounts of flavors such as onion, garlic, beef, chicken and cheese.

DISCUSSION OF PROCESS AND PRODUCT REQUIREMENTS

In developing the above process and product, several critical requirements were discovered—all of which must be controlled to obtain the desired appearance, flavor, and texture in the product reconstituted for consumption. These critical points will be discussed in the order encountered in practicing the process.

1. Source of potato solids

The dough solids are substantially cooked potato solids with intact cells. These are obtained from instant dehydrated mashed potato products such as potato granules, potato flakes, or agglomerates in combination with water and/or freshly cooked potatoes. If this ingredient contains an appreciable percentage of ruptured potato cells, either in raw or cooked form, the product tends to puff during processing and the end product does not have the proper rice-like texture.

2. Binder-film forming matrix system

A binder combination is required which acts synergistically so that the product at all stages of the process will have the required physical properties. One binder ingredient is required to make the dough formable at the required moisture and to hold the product intact during frying. Methyl cellulose and/or guar gum perform this function. The second component of the binder system is required to produce, after heat treatment, the required gel matrix and to form a film which prevents excessive oil absorption during the final drying step. Raw corn or potato starch, or a protein component such as soy flour or isolated soy protein perform this necessary function. If freeze-thaw stability is required, this component of the binding system must be starch. The resultant gel matrix prevents weeping after reconstitution, freezing and thawing.

3. Moisture of dough prior to forming

The moisture content of the dough is quite critical if the required structure, appearance and texture is to be obtained. If the moisture content by weight exceeds about 78%, the pieces stick together excessively and the product tends to puff during the drying process. If the product is significantly below 64%, the dough feathers during extrusion and also sloughs excessively and is too fragile when reconstituted.

4. Temperature of dough prior to forming

The proper product can be produced only if the temperature of the dough is in a narrow range which is dictated by the source of the raw starch used. When raw corn starch is a dough ingredient, a maximum dough temperature of 160° F. can be used. If raw potato starch is used, the dough temperature must be kept below 140° F. The temperature must be high enough to promote swelling of the potato ingredient, but must be below the gelatinization temperature of the raw starch employed. If temperatures at this point in the process cause gelatinization, pieces are difficult to form and the formed pieces are starchy and sticky.

5. Piece size

The formed piece size disclosed in the preferred embodiment is considered optimum for "rice." Pieces as small as ⅛× ⅛× ¼ inch have been made satisfactorily and when the ultimate use is in a Hashbrown product, pieces of 3/32 × 3/32 × 1½ inches were produced. One skilled in this art will know that pieces of much larger cross section would require much longer rehydration times to avoid dry centers in the finished product, thus limiting the practical maximum size.

6. Predrying of formed pieces

The criticality of the predrying of the formed pieces relates to the drying rate and the extent of predrying before the following processing step. It is necessary that the moisture content of the pieces at the conclusion of this step be below 60% by weight, preferably about 30%. If the moisture content exceeds 60%, the pieces tend to puff in the following step. If the predrying step is continued appreciably below product moisture of 30% by weight, chances of undesirable browning and resultant reduced shelf life are increased. Therefore, excessive dehydration air temperatures and prolonged predrying times must be avoided. Although predrying in heated air does not result in gelatinization, freedom from gelatinization is not a requirement after the discrete piece has been formed. For economy and efficiency, the temperature of the drying air should be as high as practical without causing undesirable puffing or browning or non-uniform drying. We have found that when predrying a mass of the formed pieces in a fluidized bed that an air temperature of about 180° F. for about 10 minutes gives an acceptable drying rate and results in proper product characteristics; however, one skilled in this art knows that lower drying temperature would accomplish predrying with reduced efficiency. Other conventional means of air drying can be practiced, such as drying on static or moving foraminous surfaces; however, fluidized bed drying is preferred.

7. Final drying in the presence of oil. (Surface Texturizing)

This critical step requires a combination of several factors. The formed pieces must have their surfaces only impregnated with edible oil or fat and the pieces must be subjected to a temperature which is sufficient to gelatinize the raw starch component and to increase the porosity of the oil-impregnated piece surface. Again, the temperature must not be high enough to result in puffing. This drying step is carried to completion which in dehydrated potato products is a final moisture content of about 7–8%. Additionally, final product color should be creamy yellow. Final drying temperatures which result in golden brown as is desired in french fries would result in a product too dark in color for a rice-like dish and the shelf life of the product decreases due to accelerated browning. When this final drying is conducted at 300° F., the desired final color and a moisture content of 7–8% can be obtained in about 30–40 seconds in drying from 30% moisture. If this oil-impregnation-drying step is not practiced to texturize the surfaces of the pieces, identically formulated products dried to completion in the absence of oil, slough excessively and have a gluey unacceptable texture when reconstituted.

This surface texturizing step is preferably done by deep fat frying. An alternative process is to spray the surfaces of the predried pieces with oil and then conduct the final drying in a hot oven until the finished moisture content of about 7–8% by weight is reached. Alternatively, the oil sprayed pieces can be autoclaved at 10 psig for approximately 5 minutes before final drying in hot air. We have found that "normal" French fry frying temperatures of about 375° F. result in an undesirably dark rice product.

The product of this invention has multiple uses, some of which are unique for dehydrated potato products. When the dehydrated product is covered with about 1.6 parts by weight of boiling water, covered, and allowed to stand about 3–4 minutes, the water is absorbed into the pieces producing a product with excellent flavor and with the unique texture of prepared instant buttered rice. Hashbrowns were produced readily from the reconstituted product by frying in a hot skillet. Excellent potato pancakes were made by forming the reconstituted "rice" into cakes and frying with a little fat or oil. Also, Hashbrowns can be produced by a "one-pan" recipe by adding about 2.5 parts by weight of water to one part by weight of the dehydrated product and heating with a little fat or oil in a skillet. Reconstitution and cooking are accomplished simultaneously and when the free water has been absorbed and steamed away, excellent hashbrowns result. The potato "rice" can be substituted for rice in onepan recipe dehydrated dinners such as Spanish Rice and Oriental Dinners, thereby reducing the preparation time by 50%.

In this disclosure, the term "instant" means a dehydrated product which is reconstitutable in liquid, usually heated, without further cooking, resulting in a product ready for consumption in a short time period such as five minutes or less. The term "texturized" as used in this disclosure describes the physical change which occurs when predried pieces as disclosed are impregnated with oil, heated and dried to produce a porous surface which renders the pieces instant and imparts a unique rice-like texture to the reconstituted product. The term "potato rice" is used in this disclosure to describe a product comprising essentially potato solids and having no rice ingredient, but having after reconstitution, the appearance, taste and texture of buttered rice as prepared for consumption. The term "cooked intact separated potato cells" means cooked potato which has been mashed to separate the cells without appreciable rupture. Mashed potatoes are the undried form and such products as potato granules, potato flakes, and potato agglomerates, clusters, nuggets and shreds are dehydrated forms.

When the above critical steps are not all followed as disclosed, the desired end product does not result. Prior art has not disclosed or suggested a process for producing an instant rice-like product made from potatoes. This disclosed process is a distinct advance in dehydrated potato art.

What is claimed is:

1. A process for the production of dehydrated instant texturized freeze-thaw stable potato product from a potato dough comprising the steps of:
   a. producing a dough comprising water in the range of 64–78% by weight and 36–22% solids by weight, said solids comprising by weight raw starch in the range of 3–10%, binder in the range of 1–5%, 0 to 1.5 flavoring, and the balance comprising essentially cooked intact separated potato cells, said water having temperature high enough to promote swelling of said cells but being lower in temperature than the gelatinization temperature of said raw starch;
   b. forming said dough into pieces in the range of ⅛ to 3/32 inch in cross section and from ¼ to 1½ inches in length;
   c. predrying said formed pieces to a moisture content in the range of 30–60% by weight in the presence of air heated sufficiently to allow efficient drying but to avoid browning;
   d. coating the surfaces of said predried pieces with edible fat or oil; and
   e. drying said coated pieces at a product temperature above the gelatinization temperature of said starch to a moisture content of about 7 to 8% by weight thereby texturizing said surfaces and instantizing said coated pieces.

2. The process as recited in claim 1 in which one part by weight of the dried product resulting from step (e) is covered with about 1.6 parts by weight boiling water and allowed to stand about 3–4 minutes to reconstitute to a dish having the appearance and texture of buttered rice.

3. The process as recited in claim 2 in which said reconstituted dish is then fried.

4. The process as recited in claim 2 in which said reconstituted dish is frozen and subsequently thawed for use in rice and potato dishes.

5. The process recited in claim 1 in which the water content of said dough is about 74%; said raw starch comprises about 5% by weight of said solids; and said binder comprises about 2% by weight of said solids.

6. The process as recited in claim 1 in which the source of said cooked intact potato cells is dehydrated instant mashed potato products.

7. The process as recited in claim 6 in which the source of at least part of said water and at least part of said cooked intact potato cells is freshly cooked mashed potatoes.

8. The process as recited in claim 1 in which the temperature of said water is about 160° F. when said raw starch is from corn, and is about 140° F. when said raw starch is from potatoes.

9. The process as recited in claim 1 in which said predrying step is conducted with said heated air at 180° F. and said predrying step is terminated when the moisture content of said predried pieces is about 30%.

10. The process as recited in claim 1 in which said coating and said final drying steps are conducted simultaneously by deep fat frying said predried pieces in about 300° F. oil or fat for about 30–40 seconds to produce a product of creamy yellow color.

11. The process recited in claim 1 in which said drying step is conducted in a hot oven.

12. The process of claim 1 in which said binder is selected from a group consisting of guar gum and methyl cellulose.

13. The process of claim 1 in which said flavoring is selected from a group of flavoring substances consisting of salt, onion, garlic, cheese, beef and chicken.

14. In a process for the production of dehydrated instant texturized potato product from a potato dough comprising the steps of:
 a. producing a dough comprising about 74% water by weight and about 26% solids by weight, said solids comprising by weight about 5–10% film-forming protein product, about 2% binder, 0 to 1.5% flavoring, and the balance comprising instant dehydrated cooked intact potato cells;
 b. forming said dough into pieces in the range of ⅛ to 3/32 inches in cross section and from ¼ to 1½ inches in length;
 c. predrying said formed pieces to a moisture content of about 30% by weight in the presence of heated air;
 d. coating the surfaces of said predried pieces with edible fat or oil; and
 e. drying said coated pieces to a moisture content of about 7–8% by weight thereby texturizing and instantizing them.

15. The process as recited in claim 14 in which said film-forming protein product is selected from a group consisting of soy flour and isolated soy protein.

16. A dehydrated instant texturized freeze-thaw stable oil-impregnated potato product produced by the process of claim 1.

* * * * *